(12) United States Patent
Tsai

(10) Patent No.: US 10,037,365 B2
(45) Date of Patent: Jul. 31, 2018

(54) COMPUTER-IMPLEMENTED PATENT SEARCHING METHOD IN CONNECTION TO MATCHING DEGREE

(71) Applicant: INTEGRAL SEARCH INTERNATIONAL LTD., Taipei (TW)

(72) Inventor: Hong-Shin Tsai, Taipei (TW)

(73) Assignee: INTEGRAL SEARCH INTERNATIONAL LTD., Taipei (TW)

( * ) Notice: Subject to any disclaimer, the term of this patent is extended or adjusted under 35 U.S.C. 154(b) by 267 days.

(21) Appl. No.: 15/011,440

(22) Filed: Jan. 29, 2016

(65) Prior Publication Data

US 2017/0220650 A1    Aug. 3, 2017

(51) Int. Cl.
  *G06F 17/30* (2006.01)
  *G06Q 50/18* (2012.01)

(52) U.S. Cl.
  CPC .... *G06F 17/30554* (2013.01); *G06F 17/3053* (2013.01); *G06Q 50/184* (2013.01)

(58) Field of Classification Search
  CPC .......... G06F 17/30554; G06F 17/3053; G06F 17/30864; G06Q 50/184
  See application file for complete search history.

(56) References Cited

U.S. PATENT DOCUMENTS

| | | | | |
|---|---|---|---|---|
| 7,890,451 B2* | 2/2011 | Cancel | ............... | G06Q 30/02 707/603 |
| 9,785,686 B2* | 10/2017 | Zhao | ............... | G06F 17/30554 |
| 9,846,694 B1* | 12/2017 | Cook | ............... | G06F 17/3064 |
| 2004/0230568 A1* | 11/2004 | Budzyn | ............. | G06F 17/30864 |
| 2007/0073653 A1* | 3/2007 | Raab | ............... | G06F 17/30654 |
| 2007/0288256 A1* | 12/2007 | Speier | ............... | G06Q 10/10 715/208 |
| 2008/0077570 A1* | 3/2008 | Tang | ............... | G06F 17/30684 |
| 2008/0120072 A1* | 5/2008 | Bartz | ............... | G06F 17/30693 705/310 |

(Continued)

OTHER PUBLICATIONS

Joho et al., A Survey of Patent Users an Analysis of Tasks, Behavior, Search Functionality and System Requirements, 2010, 10 pages.*

*Primary Examiner* — Noosha Arjomandi
(74) *Attorney, Agent, or Firm* — Maschoff Brennan

(57) ABSTRACT

A patent searching method in connection to a matching degree, wherein the patent searching method is applied in a patent searching system to search a patent specification having a plurality of patent sections including abstract, description, and claims, in a patent database, the patent searching method comprising: a keyword designating step of receiving a designated keyword including at least one component keyword so as to determine a searching condition, and a search determining step of determining a matching degree of the patent specification in connection to the designated keyword, wherein there are a plurality of derived patent specifications, and the matching degree of each derived patent specification in connection to the designated keyword is assigned a searching weighted result value obtained by adding up at least one searching weighted value which is assigned to all component keywords belonging to the designated keyword.

5 Claims, 5 Drawing Sheets

(56) References Cited

U.S. PATENT DOCUMENTS

| | | | |
|---|---|---|---|
| 2008/0154848 A1* | 6/2008 | Haslam | G06F 17/30011 |
| 2008/0228725 A1* | 9/2008 | Huang | G06F 17/30643 |
| 2009/0138466 A1* | 5/2009 | Henry | G06F 17/30017 |
| 2010/0287177 A1* | 11/2010 | Resnick | G06F 17/30616 707/765 |
| 2012/0221544 A1* | 8/2012 | Hu | G06Q 30/02 707/708 |
| 2014/0075004 A1* | 3/2014 | Van Dusen | H04L 41/04 709/223 |
| 2014/0164352 A1* | 6/2014 | Denninghoff | H03H 9/02622 707/711 |
| 2014/0214808 A1* | 7/2014 | Satoh | G06F 17/30619 707/722 |
| 2014/0214811 A1* | 7/2014 | Aramaki | G06F 17/30654 707/722 |
| 2014/0324808 A1* | 10/2014 | Sandhu | G06F 17/2785 707/706 |
| 2014/0365386 A1* | 12/2014 | Carstens | G06Q 50/184 705/310 |
| 2015/0074005 A1* | 3/2015 | Brougher | G06F 17/30 705/311 |
| 2015/0178272 A1* | 6/2015 | Geigel | G06F 17/2785 704/9 |
| 2016/0275148 A1* | 9/2016 | Jiang | G06F 17/3043 |
| 2017/0337650 A1* | 11/2017 | Volin | G06Q 50/184 |

* cited by examiner

Patent Searching System  Keyword : connect && direct

| | Application Number | Title | Filing Date | Applicant | Inventors |
|---|---|---|---|---|---|
| ⊙ Taiwan Patent Database | 1032XXXXXX | XXXXX | 2014/XX/XX | XXX | XXX |
| ○ US Patent Database | 1032XXXXXX | XXXXXXX | 2014/XX/XX | XXX | XXX |
| ○ Japan Patent Database | ...... | ...... | ...... | ...... | ...... |
| ○ EU Patent Database | 1032XXXXXX | XXXXXX | 2014/XX/XX | XXX | XXX |

<< Previous Page   Page 1 / 326 pages, 3257 results in total   Next Page >>

FIG.2

| Abstract | Claims | Description | Searching Weighted Value |
|---|---|---|---|
| not match | not match | not match | 0 |
| not match | not match | match | 20 |
| not match | match | not match | 70 |
| not match | match | match | 80 |
| match | not match | not match | 30 |
| match | not match | match | 60 |
| match | match | not match | 90 |
| match | match | match | 300 |

FIG.3

| | Keyword | Patent Sections Containing the Keyword | Searching Weighted Value | Total |
|---|---|---|---|---|
| Patent Specification A | connect | Abstract、Claims、Description | 300 | 380 |
| | direct | Claims、Description | 80 | |
| Patent Specification B | connect | Abstract、Claims、Description | 300 | 390 |
| | direct | Abstract、Claims | 90 | |

FIG.4

Abstract

○○○○○○○，○○○○○○○○○○，○○○○
○○○○。○○○○○○○○○○○○○○○○○○
○○○○○○。○○○○○○○○○○○○○○○○○
○○○○○○○○，○○○○○○○○○○○○。

Description

○○○○○○○○○○○○○○○，○○○○○○
○○，○○○○○○○○○○○○，○○○○○○○
○○○○○○○○，○○○○○○○○○○○○○○
○○○○○○○○○○○○○。○○○○○○○
○○○○○○○○○○○○○○○○○○○。
○○○○○○○○○○○○○○○○○○○○○○○○
○○○，○○○○○○○，○○○○○○○○○○○
○○○○○○○○。

Claims

COMPUTER-IMPLEMENTED PATENT SEARCHING METHOD IN CONNECTION TO MATCHING DEGREE

FIELD OF THE INVENTION

The present invention relates to a computer-implemented patent searching method, and more particularly to a computer-implemented patent searching method in connection to a matching degree.

BACKGROUND OF THE INVENTION

Patent search is performed by inputting a keyword into a computer patent database through a computer system, in which the keyword can be a single keyword or a keyword composed of several component keywords, and then the keyword is used as a search term by which the patent search is performed in a computer patent database so as to obtain from the computer system a plurality of patent specifications among which the users can browse through a computer system and choose wanted patent specifications from a computer system. After the users have selected the wanted patent specifications, they could utilize these patent specifications to perform patent-related research such as prior art computer searching and computer-implemented patent analysis. Good computer-implemented patent search ensures proper patent deployment, accurate patent applications and complete collection of patent data.

Prior computer-implemented patent searching method is not completely perfect. The patent specifications derived from prior computer-implemented patent searching method are a collection of patent specifications including designated keywords, which are not arranged in a specific order. The derived patent specifications are at most arranged according to the patent application filing date or the publication date for the users to select and utilize. However, if the derived patent specifications can be displayed in an order according to the matching degree in connection with the designated keyword, the users can better determine the search result from the computer-implemented patent searching system. Therefore, the purpose of the present invention is to provide a computer-implemented patent searching method of deriving the matching degree of the patent specifications that match the designated keywords.

SUMMARY OF THE INVENTION

Accordingly, one of the objects of the present invention is to provide a computer-implemented patent searching method in connection to a matching degree, which determines the matching degree according to the patent sections in which a plurality of designated keywords appear, and accordingly the computer-implemented patent-searching method of the present invention displays the patent specifications in sequence according to searching weighted result values of the derived patent specifications with respect to the designated keyword.

In order to solve the problem in prior art, the technical means adopted by the present invention provides a computer-implemented patent searching method in connection to a matching degree, wherein the computer-implemented patent searching method is applied in a computer-implemented patent searching system to search a patent specification having a plurality of patent sections from a computer patent database of the computer-implemented patent-searching system, the patent section including abstract, description and claims, in a patent database, the patent searching method comprising execution on a processor the steps of:

a keyword designating step of receiving, with a processor, a designated keyword including at least one component keyword so as to determine a searching condition by which the plurality of patent sections of each patent specification in the computer patent database are searched according to the designated keyword so as to derive, from the computer patent database to a memory, a patent specification whose patent sections include the designated keyword;

a search determining step, with a processor, of determining a matching degree of the derived patent specification in connection to the designated keyword in accordance with the patent section where the designated keyword appears; and a displaying step of displaying, with a processor, the patent specifications, in a display, in a sequence according to a searching weighted result values of the derived patent specifications with respect to the designated keyword, wherein there are a plurality of derived patent specifications, and the matching degree of each derived patent specification in connection to the designated keyword is assigned, with a processor, the searching weighted result value obtained by adding up at least one searching weighted value which is assigned according to the matching degree of each derived patent specification in connection to all component keywords belonging to the designated keyword, and wherein the searching weighed value in connection to one component keyword and where the component keyword is found in patent sections is assigned, with a processor, according to criterion rules stored in a memory including: the searching weighed value for a situation that one component keyword appears in the abstract, the description and the claims is assigned a highest searching weighted value which indicates a highest matching degree in connection to the component keyword, the searching weighed value for a situation that one component keyword appears in the abstract and the claims but not in the description is assigned a second highest searching weighted value which indicates a second highest matching degree in connection to the component keyword, and the searching weighed value for a situation that one component keyword appears in the abstract and the description but not in the claims and for a situation that one component keyword appears in the claims and the description but not in the abstract is assigned a searching weighted value lower than the highest searching weighted value and the second highest searching weighted value.

In one embodiment of the present invention, each combination of the patent sections is given, with a processor, a searching weighted value stored in a memory according to whether the component keyword appears in each patent section.

In one embodiment of the present invention, the searching weighted value is a fixed value or a dynamic value, and wherein the dynamic value increases or decreases according to the chosen patent specifications.

In one embodiment of the present invention, the searching weighed value in connection to one component keyword and where the component keyword is found in patent sections is predetermined by the computer-implemented patent searching system or is determined by a user.

In one embodiment of the present invention, the computer-implemented patent searching method further comprises a displaying step of displaying the patent specifications in sequence, wherein the sequence is determined according to the searching weighted result values of the derived patent specifications with respect to the designated keyword.

In one embodiment of the present invention, the computer-implemented patent searching method further comprises a suggesting step of suggesting, with a processor, a browsing priority order to the user in the display, wherein the browsing priority order is determined by the processor according to the searching weighted result values of the derived patent specifications in connection to the designated keyword.

The computer-implemented patent searching method in connection to a matching degree as claimed in the present invention determines the matching degree of each derived patent specification according to the patent sections in which the designated keywords appear, and displays the derived patent specifications in an order according to the matching degree so that the users can better determine the search result.

BRIEF DESCRIPTION OF THE DRAWINGS

FIG. 2 illustrates a result frame provided by the computer-implemented patent searching method in connection to a matching degree according to the embodiment of the present invention.

FIG. 3 illustrates the combinations of patent sections provided by the computer-implemented patent searching method in connection to a matching degree according to the embodiment of the present invention.

FIG. 4 illustrates a search result with matching degrees in connection to the designated keywords according to the embodiment of the present invention.

FIG. 5 illustrates the framework of general patent specifications.

DETAILED DESCRIPTION OF THE PREFERRED EMBODIMENTS

Figure 1:
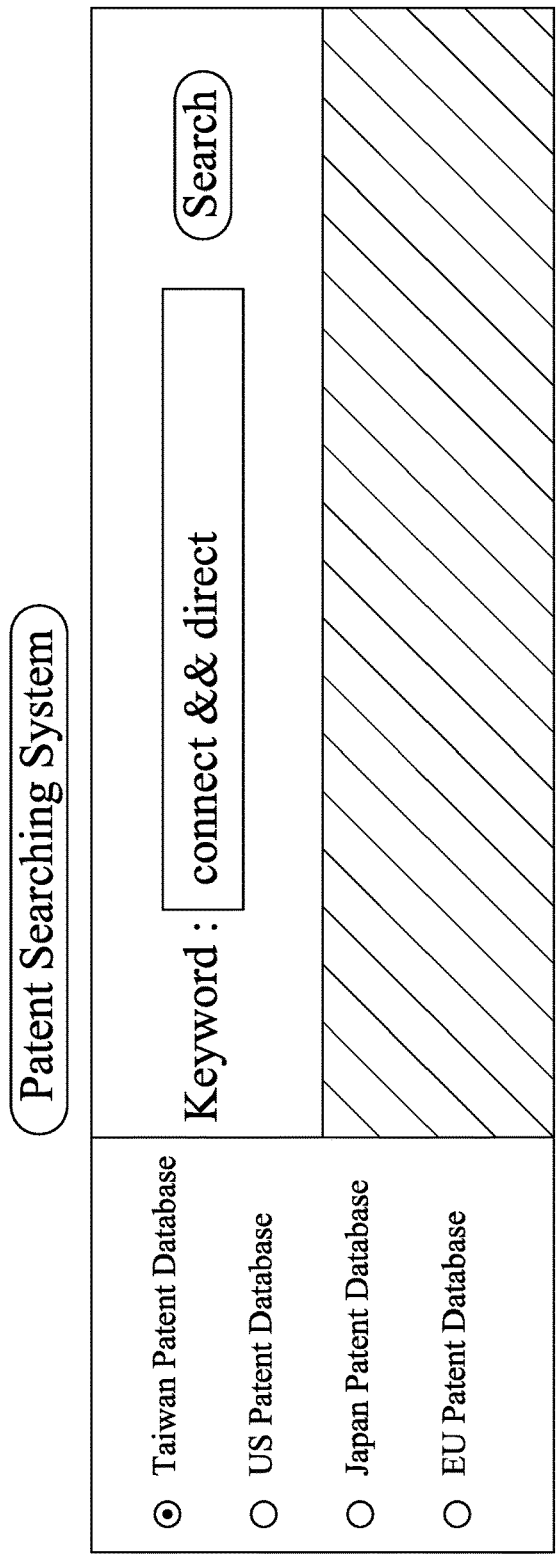
FIG. 1 illustrates an input frame provided by a computer-implemented patent searching method in connection to a matching degree according to one embodiment of the present invention.

The preferred embodiments of the present invention are described below with reference to FIG. 1 to FIG. 5. The description herein is for descriptive purpose only and is not to be construed as limiting the scope of the present invention.

Figure 5:
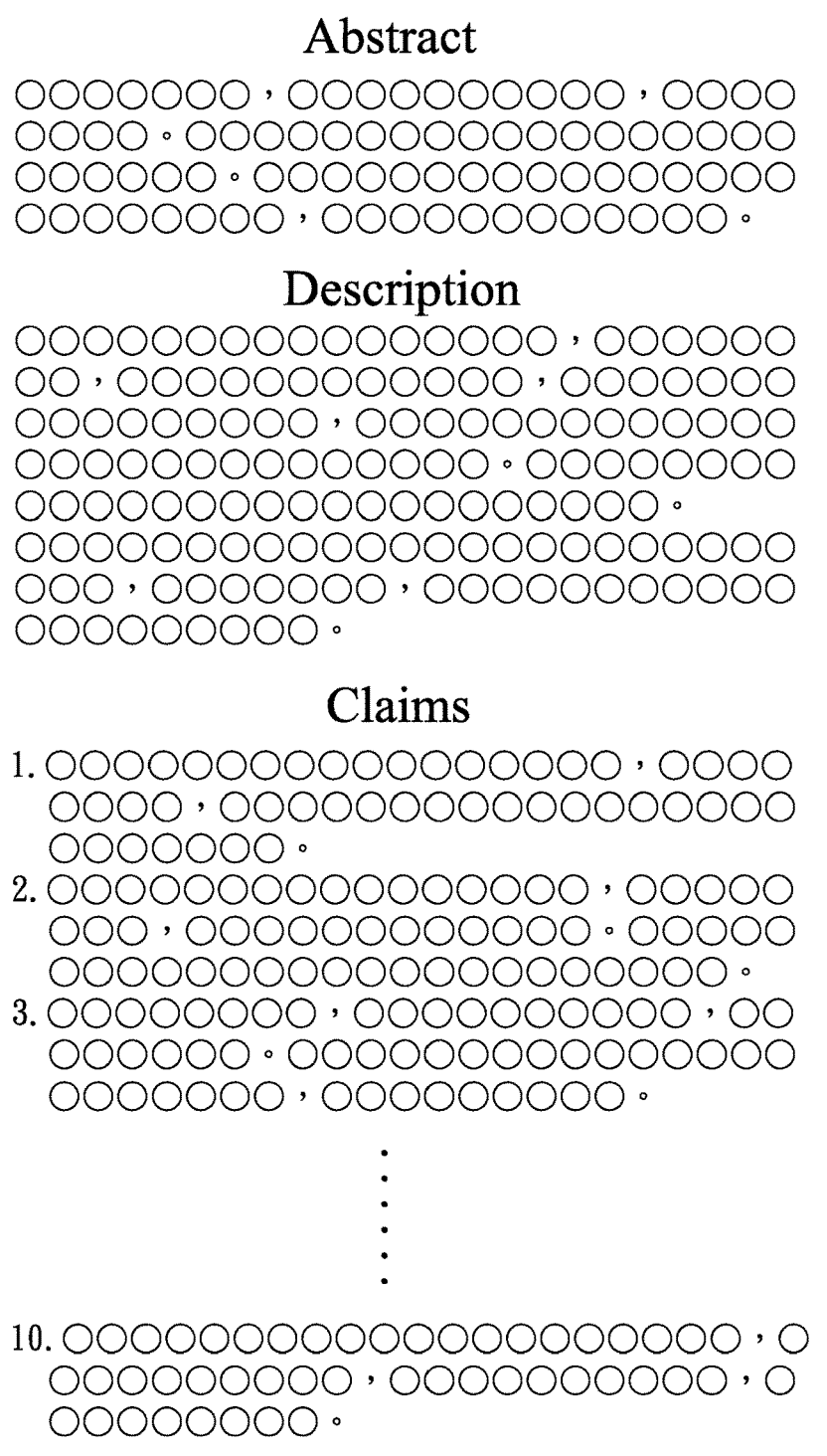

As shown in FIG. 5, the content of a patent specification includes an abstract, a description, and claims. The abstract includes the description of the patent, which is generally a brief summary of claim 1 of the patent, the description includes a detailed description of the embodiments of the invention, and the claims define the scope of the invention. In the present invention, abstract, description, and claims are defined as patent sections of a patent specification. The present invention determines in which patent sections the designated keywords are located so as to further determine the degrees to which the patent specifications match, i.e. the matching degrees, and further displays the patent specifications in an order according to the matching degree.

Despite the fact that claim 1 of each patent specification is the most important part of a patent, to find specific contents in claim 1 still needs specific process, that is to say, an analysis of the claims is needed. Thus, to find specific contents in claim 1 is a task of complexity. Moreover, in the practice of patent, an abstract is usually an organized version, or even a concise version of claim 1. Thus an abstract plays an important role in a patent specification.

Based on the above reason, the inventor of the present invention regards the patent section(s) in which the designated keywords are found as critical in determining the matching degree of patent specifications in connection to the designated keywords. The matching degree is called the matching degree in connection to the designated keywords.

According to one embodiment of the present invention, a computer-implemented patent searching method in connection to a matching degree wherein the computer-implemented patent searching method is applied in a computer-implemented patent searching system to search a patent specification having a plurality of patent sections from a computer database of the computer-implemented patent searching system, the patent section includes abstract, description, and claims. The computer-implemented patent searching method comprises execution on a processor the steps of: a keyword designating step of receiving, with a processor, a designated keyword including at least one component keyword so as to determine a searching condition by which the plurality of patent sections of each patent specification in the computer patent database are searched according to the designated keyword so as to derive, from the computer patent database to a memory, a patent specification whose patent sections include the designated keyword, and a search determining step of determining, with a processor, a matching degree of the derived patent specification in connection to the designated keyword in accordance with the patent section where the designated keyword appears.

As shown in FIG. 1, in the keyword designating step, the keyword includes a plurality of component keywords. For example, when designating "connect && direct" as a keyword, it means that "connect" and "direct" are designated as the component keywords of the keyword. The computer-implemented patent searching method of the present invention searches the patent sections of the patent specifications in computer patent database, e.g. computer patent database of Taiwan Intellectual Property Office (TIPO), for the designated keyword.

As shown in FIG. 2 illustrating one embodiment of the present invention, in which there are 3257 patent search results of a patent search using "connect && direct" as the designated keyword. The 3257 patent specifications are called a search result.

In the computer-implemented patent searching method of the present invention, each patent specification is given, with a processor, a searching weighted result value according to the matching degree in connection with the designated keyword.

In the search determining step, the matching degree of the patent specification is determined according to the patent sections, i.e. the abstract, the description, and the claims, in which the designated keyword appears. In one embodiment of the present invention, the patent specifications are assigned, with a processor, searching weighted result values in accordance with the patent sections where the designated keywords appear so as to indicate the matching degree of each derived patent specification in connection to all component keywords belonging to the designated keyword.

According to one embodiment of the present invention, each combination of the plurality of patent sections is assigned, with a processor, a searching weighted result value according to whether the designated keyword appears in each patent section.

As mentioned above, the patent sections include abstract, description, and claims. The combinations of the patent sections are shown in FIG. 3. As can be seen in FIG. 3, each combination of the patent sections is assigned, with a processor, a searching weighted value stored in a memory to indicate the matching degree of each derived patent specification in connection to all component keywords belonging to the designated keyword.

In one embodiment of the present invention, the searching weighed value for a situation that one component keyword appears in the abstract, the description and the claims is assigned a highest searching weighted value which indicates a highest matching degree in connection to the component keyword, and the searching weighed value for a situation that one component keyword appears in the abstract and the claims but not in the description is assigned a second highest searching weighted value which indicates a second highest matching degree in connection to the component keyword, and the searching weighed value for a situation that one component keyword appears in the abstract, the description but not in the claims is assigned a third highest searching weighted value which indicates a third highest matching degree in connection to the component keyword.

The reason for the above-described assignment is that if a component keyword appears in the abstract, the description, and the claims, it means that the component keyword constantly shows up in the entire patent specification, and therefore the situation in which one component keyword appears in the abstract, the description and the claims is of the highest matching degree. Secondly, in general practice of patent, the content of an abstract is a short summary of claim 1, so if the component keyword appears in both the abstract and the claims, it is very likely that the component keyword is in claim 1. Thus, even though the component keyword does not appear in the description, the situation in which the component keyword appears in the abstract and the claims is of the second highest matching degree. Next, if a component keyword appears only in the abstract and the description but not in the claims, it is likely that the component keyword belongs to one of the preferred embodiments and is not defined in the claims. Thus, the situation in which the component keyword appears in the abstract and the description but not in the claims is assigned a matching degree lower than that of the above-described highest matching degree and the second highest matching degree.

In another embodiment of the present invention, when the component keyword appears in the abstract, the description, and the claims, the patent specification is assigned a highest searching weighted value indicating the highest matching degree in connection to the component keyword. When the component keyword appears in the abstract and the claims but not in the description, the patent specification is assigned a second highest searching weighted value indicating the second highest matching degree in connection to the component keyword. When the component keyword appears in the claims and the description but not in the abstract, the patent specification is assigned a searching weighted value indicating a matching degree lower than the highest and the second highest matching degree in connection to the component keyword.

The reason for the above-described assignment is that if a component keyword appears in the abstract, the claims, and the description, it means that the component keyword constantly shows up in the entire patent specification, and therefore the situation in which one component keyword appears in the abstract, the description and the claims is assigned the highest searching weighted value. Secondly, in general practice of patent, the content of an abstract is a short summary of claim 1, so if the component keyword appears in both the abstract and the claims, it is very likely that the component keyword is in claim 1. Thus, even though the component keyword does not appear in the description, the situation in which the component keyword appears in the abstract and the claims is assigned the second highest searching weighted value. Next, if a component keyword appears only in the abstract and the description but not in the claims, it is likely that the component keyword belongs to one of the preferred embodiments and is not defined in the claims. Thus, the situation in which the component keyword appears in the abstract and the description but not in the claims is assigned a searching weighted value lower than that of the above-described highest searching weighted value and the second highest searching weighted value.

In another embodiment of the present invention, when the component keyword appears in the abstract, the description, and the claims, the patent specification is assigned a highest searching weighted value indicating the highest searching weighted value indicating the matching degree in connection to the component keyword. When the component keyword appears in the abstract and the claims but not in the description, the patent specification is assigned a second highest searching weighted value indicating the second highest matching degree in connection to the component keyword. When the component keyword appears in the abstract and the description but not in the claims, the patent specification is assigned a searching weighted value indicating a matching degree lower than the highest and second highest matching degree in connection to the component keyword.

In this embodiment, the method for the determination of the searching weighted value indicating the highest matching degree in connection to the component keyword and the searching weighted result value indicating the second highest matching degree in connection to the component keyword is identical to the determination method as described before, so further elaboration will be omitted here. As to the situation in which the component keyword appears in the abstract and the description but not in the claims, it is very likely that the abstract is not a short summary of claim 1 but an independent description instead. There is also a possibility that the component keyword is not defined in the claims. Therefore, in the situation in which the component keyword appears in the abstract and the description but not in the claims of a patent specification, the patent specification is assigned a searching weighted result value indicating a matching degree lower than the above-described highest and second highest matching degree.

After determining the searching weighted result value of each component keyword by referring to the table of FIG. 3 which shows the combinations of patent sections containing or not containing the component keyword, the computer-implemented patent searching method of the present invention can add up the searching weighted value in connection to each component keyword included in the designated keyword to derive the searching weighted result value of the patent specification.

In one embodiment of the present invention, the above-described search result which contains 3257 patent specifications is used as an example. As shown in FIG. 4 which illustrates a search result with matching degrees in connection to the designated keywords, the designated keyword is "connect && direct". With regard to the patent specification A, after referring to FIG. 5, it is determined that the component keyword "connect" shows up in all the patent sections, i.e. the abstract, the description, and the claims, and thus the searching weighted value in connection to the component keyword "connect" is 300. And after referring to FIG. 5, it is determined that the component keyword "direct" shows up in the claims and the description and not in the abstract, and thus the searching weighted value in connection to the component keyword "direct" is 80. By adding 300 and 80, the searching weighted result value of the patent specification A in connection to the designated keyword "connect && direct" is obtained, i.e. the searching weighted result value of the patent specification A in connection to the designated keyword "connect && direct" is 380.

With regard to the patent specification B, after referring to FIG. 5, it is determined that the component keyword "connect" shows up in all the patent sections, i.e. the abstract, the description, and the claims, and thus the searching weighted value in connection to the component keyword "connect" is 300. Moreover, after referring to FIG. 5, it is determined that the component keyword "direct" shows up in the abstract and the claims and not in the description, and thus the searching weighted value in connection to the component keyword "direct" is 90. By adding 300 and 90, the searching weighted result value of the patent specification B in connection to the designated keyword "connect && direct" is obtained, i.e. the searching weighted result value of the patent specification A in connection to the designated keyword "connect && direct" is 390.

As shown in FIG. 2, after a plurality of derived patent specifications are each assigned a searching weighted result value, the derived patent specifications are displayed in sequence, wherein the sequence is determined according to the magnitude of the searching weighted result values.

According to one embodiment of the present invention, the computer-implemented patent searching method further comprises a suggesting step of suggesting, with a processor, a browsing priority order to the user in the display, in which the browsing priority order is determined by the processor according to the magnitude of the searching weighted result values of the derived patent specifications in connection to the designated keyword. In other words, the patent specifications with the highest matching degree can be displayed to the users. The specific way of embodiment is, but not limited to: classifying the matching degree of the derived patent specifications and then displaying them accordingly. Via the classification, the derived patent specifications with higher searching weighted result value are displayed first, and the other patent specifications are displayed in descending order of the searching weighted result value. In this way, the users can first see the patent specifications with high matching degrees in connection to the designated keyword.

The searching weighed value in connection to one component keyword and where the component keyword is found in patent sections is predetermined by the computer-implemented patent searching system or is determined by a user. For instance, the above-mentioned searching weighted values 300, 90, and 80 can be predetermined by the computer-implemented patent searching system or are determined by a user. The reason as to why the system automatically chooses 300 is that the number of component keywords is generally two to four, and therefore if there is a patent specification which has a higher searching weighted value in connection to a single component keyword, then in the present invention, such patent specification is expected to be displayed with higher priority rather than be exceeded by a patent specification with a higher searching weighted result value including a plurality of lower searching weighted values in connection to a plurality of component keywords. For example, under the circumstances that a component keyword "connect" is found to have a higher searching weighted value with respect to a patent specification, and there are three other component keywords, e.g. "direct", "interlocking", and "transmit" having lower searching weighted values with respect to another patent specification, if the higher searching weighted value is three times larger than the lower searching weighted values, then the searching weighted result value composed of three lower searching weighted values cannot exceed the searching weighted result value composed of at least the higher searching weighted value. For example, if "connect" has the highest searching weighted value 300, then whilst there are three component keywords having a searching weighted value 90, 300 is still larger than three times 90 (270). This way, the patent specifications with a component keyword that appears in all patent sections can be displayed with higher priority.

In one embodiment of the present invention, the searching weighted result value is a fixed value or a dynamic value, wherein the dynamic value increases or decreases according to the chosen patent specifications.

After displaying the derived patent specifications to the users, the searching weighted value is increased or decreased according to the patent specification the user chooses to watch. For example, if the user chooses the patent specification C, in which the designated keyword appears in the claims and the description but not in the claims, then the original searching weighted value 60 is increased.

The above description is only for the purpose of explaining the preferred embodiments of the present invention. A person with ordinary skill in the art can make various modifications according to the claims defined below and the above description. Nevertheless, these modifications shall still fall within the spirit and scope of the present invention.

What is claimed is:

1. A computer-implemented patent searching method in connection to a matching degree, wherein the computer-implemented patent searching method is applied in a computer-implemented patent searching system to search a patent specification having a plurality of patent sections from a computer patent database of the computer-implemented patent searching system, the patent section including abstract, description, and claims, in a patent database, the computer-implemented patent searching method comprising execution on a processor the steps of:

a keyword designating step of receiving, with a processor, a designated keyword including at least one component keyword so as to determine a searching condition by which the plurality of patent sections of each patent specification in the computer patent database are searched according to the designated keyword so as to derive, from the computer patent database to a memory, a patent specification whose patent sections include the designated keyword;

a search determining step of determining, with a processor, a matching degree of the derived patent specification in connection to the designated keyword in accordance with the patent section where the designated keyword appears; and a displaying step of displaying, with a processor, the patent specifications, in a display, in a sequence according to a searching weighted result values of the derived patent specifications with respect to the designated keyword, wherein there are a plurality of derived patent specifications, and the matching degree of each derived patent specification in connection to the designated keyword is assigned, with a processor, the searching weighted result value obtained by adding up at least one searching weighted value which is assigned according to the matching degree of each derived patent specification in connection to all component keywords belonging to the designated keyword, and wherein the searching weighed value in connection to one component keyword and where the component keyword is found in patent sections is assigned, with a processor, according to criterion rules stored in a memory including: the searching weighed value for a situation that one component keyword appears in the abstract, the description and the claims is assigned a highest searching weighted value which indicates a highest matching degree in connection to the component keyword, the searching weighed value for a situation that one component keyword appears in the abstract and the claims but not in the description is assigned a second highest searching weighted value which indicates a second highest matching degree in connection to the component keyword, and the searching weighed value for a situation that one component keyword appears in the abstract and the description but not in the claims and for a situation that one component keyword appears in the claims and the description but not in the abstract is assigned a searching weighted value lower than the highest searching weighted value and the second highest searching weighted value.

2. The computer-implemented patent searching method as claimed in claim 1, wherein each combination of the patent sections is given, with a processor, a searching weighted value stored in a memory according to whether the component keyword appears in each patent section.

3. The computer-implemented patent searching method as claimed in claim 2, wherein the searching weighted value is a fixed value or a dynamic value, and wherein the dynamic value increases or decreases according to the chosen patent specifications.

4. The computer-implemented patent searching method as claimed in claim 1, wherein the searching weighed value in connection to one component keyword and where the component keyword is found in patent sections is predetermined by the computer-implemented patent searching system or is determined by a user.

5. The computer-implemented patent searching method as claimed in claim 1, further comprising a suggesting step of suggesting, with a processor, a browsing priority order to the user in the display, wherein the browsing priority order is determined by the processor according to the searching weighted result values of the derived patent specifications in connection to the designated keyword.

* * * * *